(12) United States Patent
Balakrishnan et al.

(10) Patent No.: US 11,481,132 B2
(45) Date of Patent: Oct. 25, 2022

(54) REMOVING STALE HINTS FROM A DEDUPLICATION DATA STORE OF A STORAGE SYSTEM

(71) Applicant: Hewlett Packard Enterprise Development LP, Houston, TX (US)

(72) Inventors: Narayanan Balakrishnan, Bangalore Karnataka (IN); Adil Babu Mohammed, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/301,166

(22) Filed: Mar. 29, 2021

(65) Prior Publication Data

US 2022/0091767 A1 Mar. 24, 2022

(30) Foreign Application Priority Data

Sep. 18, 2020 (IN) .............................. 202041040593

(51) Int. Cl.
*G06F 3/06* (2006.01)
*G06F 11/10* (2006.01)

(52) U.S. Cl.
CPC .......... *G06F 3/0641* (2013.01); *G06F 3/0608* (2013.01); *G06F 3/0652* (2013.01); *G06F 3/0673* (2013.01); *G06F 11/1004* (2013.01)

(58) Field of Classification Search
CPC .... G06F 3/0641; G06F 3/0608; G06F 3/0652; G06F 3/0673; G06F 11/1004
See application file for complete search history.

(56) References Cited

U.S. PATENT DOCUMENTS

| | | | |
|---|---|---|---|
| 6,789,156 B1* | 9/2004 | Waldspurger | G06F 12/1018 718/1 |
| 8,224,874 B2 | 7/2012 | Guo et al. | |
| 8,239,584 B1* | 8/2012 | Rabe | G06F 3/0605 711/170 |
| 8,732,403 B1* | 5/2014 | Nayak | G06F 3/0619 711/170 |
| 8,904,120 B1 | 12/2014 | Killamsetti et al. | |
| 8,930,306 B1* | 1/2015 | Ngo | G06F 16/182 707/625 |
| 9,207,930 B2 | 12/2015 | Srivas et al. | |
| 9,715,434 B1* | 7/2017 | Xu | G06F 3/067 |
| 9,792,316 B1 | 10/2017 | Cremelie | |
| 10,417,202 B2 | 9/2019 | Nazari et al. | |
| 10,649,829 B2 | 5/2020 | Sherlock et al. | |
| 11,288,252 B2 | 3/2022 | Kimura | |
| 2004/0027382 A1 | 2/2004 | Kuehn | |

(Continued)

OTHER PUBLICATIONS

Mandal, S. et al.; "Using Hints to Improve Inline Block-layer Deduplication"; Feb. 22-25, 2016; 9 pages.

*Primary Examiner* — Christopher D Birkhimer
(74) *Attorney, Agent, or Firm* — Hewlett Packard Enterprise Patent Department

(57) ABSTRACT

Examples include removing stale hints from a data deduplication store (DDS) in a storage system. Some examples incorporate an epoch value in a hint, that is written in the DDS, for data that is present in a snapshot of one of a plurality of virtual volumes in a storage system and use the epoch value to identify a stale hint and remove the stale hint from the DDS.

18 Claims, 4 Drawing Sheets

(56) References Cited

U.S. PATENT DOCUMENTS

| | | | |
|---|---|---|---|
| 2008/0144079 A1* | 6/2008 | Pandey | H03M 7/30 |
| | | | 358/1.15 |
| 2010/0077013 A1* | 3/2010 | Clements | G06F 16/1748 |
| | | | 707/822 |
| 2010/0174881 A1* | 7/2010 | Anglin | G06F 11/1453 |
| | | | 711/E12.103 |
| 2010/0281081 A1* | 11/2010 | Stager | G06F 9/5022 |
| | | | 707/814 |
| 2017/0322878 A1 | 11/2017 | Wang et al. | |
| 2018/0059956 A1* | 3/2018 | Tsirkin | G06F 11/1453 |
| 2018/0173731 A1 | 6/2018 | Nazari et al. | |
| 2018/0314727 A1* | 11/2018 | Epstein | G06N 5/003 |

* cited by examiner

REMOVING STALE HINTS FROM A DEDUPLICATION DATA STORE OF A STORAGE SYSTEM

BACKGROUND

Minimizing redundant data is one of the primary criteria for efficient storage systems. Storage systems in an organization often contain duplicate copies of data, which may be redundant. Data deduplication is a technique for eliminating such redundant data. In general, the data deduplication technique reduces or eliminates occurrences in which duplicate copies of data are written in a storage system.

BRIEF DESCRIPTION OF DRAWINGS

The following detailed description references the drawings, wherein.

DETAILED DESCRIPTION

Figure 1:
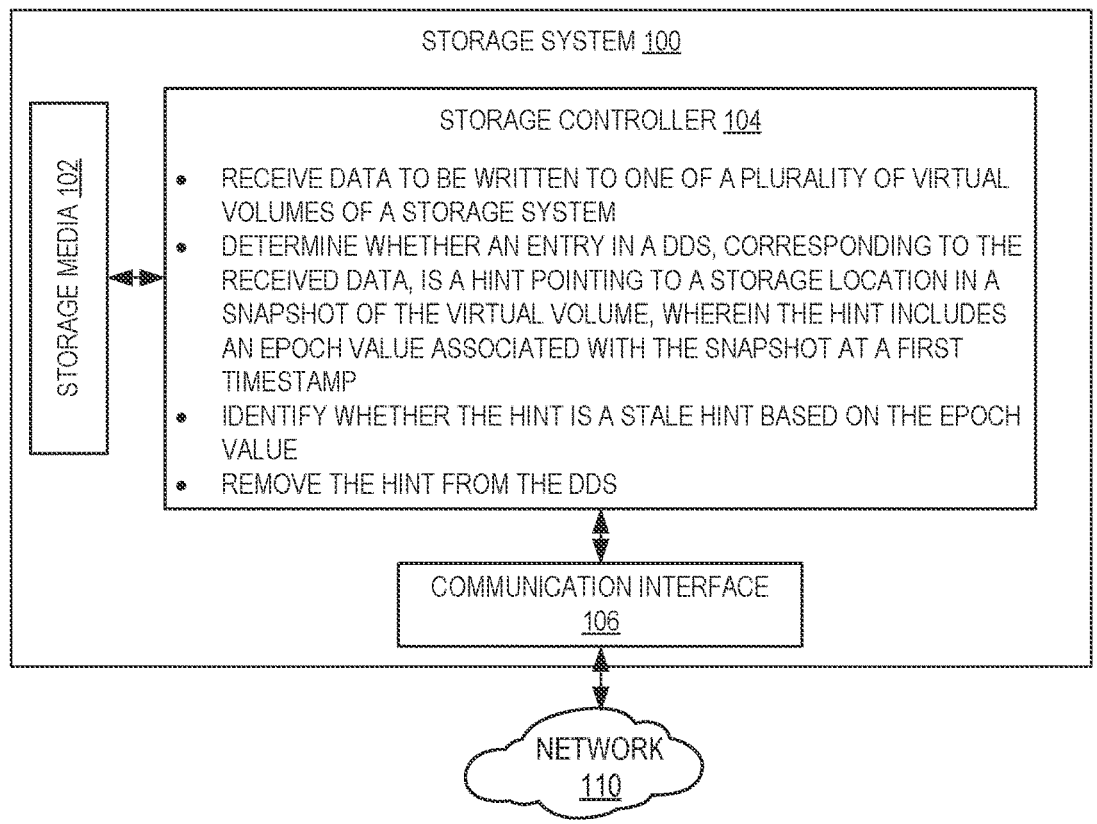
FIG. 1 is a block diagram of an example storage system including storage media, a communication interface, and a storage controller that maintains data deduplication in the storage system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. It will also be understood that, although the terms first, second, etc. may be used herein to describe various elements, these elements should not be limited by these terms, as these terms are only used to distinguish one element from another unless stated otherwise or the context indicates otherwise. The term "based on" means based at least in part on.

As noted, data deduplication may maintain a single copy of data and eliminate one or more duplicate copies of the data. In order to maintain the data deduplication, separate data stores may be used for writing singleton data and duplicate data in the storage system. The singleton data may be written in a private data store (PDS) associated with one of a plurality of virtual volumes in the storage system. In an example, each virtual volume in the storage system may be associated with its own PDS to write singleton data. The duplicate data, on the other hand, may be written in a deduplication data store (DDS), which may be shared among all the virtual volumes in the storage system. In this context, singleton data may refer to data that is written in one of the virtual volumes in the storage system (i.e., no identical copy of the data is written in any other virtual volume). Duplicate data may refer to data that is determined to be the same as a previously written data in one of the virtual volumes. In other words, the duplicate data may refer to data that is written multiple times in the same virtual volume or different virtual volumes in the storage system. After writing the duplicate data in the DDS, the previously written data (that is the same as the duplicate data) may be removed from the storage system to maintain a single copy of the data.

However, in certain examples, several assumptions may be made (e.g., in order to increase efficiency of the data deduplication) to determine whether data is singleton data or duplicate data, which may occasionally be mistaken. Such instances may cause to write singleton data in the DDS. That is, it may be possible for the DDS to write singleton data mistakenly assuming it is duplicate data. As singleton data are meant to be written in the PDSs associated with the virtual volumes and duplicate data are meant to be written in the DDS, the presence of such singleton data in the DDS may cause increased redundant data in the DDS, which, in turn, cause increased fragmentation of the DDS, inefficient space usage and performance degradation. The presence of singleton data in the DDS may also cause increased latencies for reads (that would otherwise be serviced by the PDSs) and excessive load in scanning the PDSs.

Examples described herein address these technological problems by reducing or preventing writing singleton data in a DDS of a storage system, which may otherwise be written in the DDS. The techniques thereby help in improving the space utilization and the overall performance of the data deduplication.

The systems and methods of the present subject matter are further described with reference to FIGS. 1-4. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter.

FIG. 1 is a block diagram of an example storage system 100. In the example illustrated in FIG. 1, the storage system 100 may include storage media 102, a storage controller 104, and a communication interface 106.

The communication interface 106 may provide an interface for communicating with one or more devices, such as client devices (not shown in FIG. 1). For example, the device(s) may communicate with the communication interface 106 via a network 110, which may include a number of network devices (e.g., switches, routers, etc.). In an example, the communication interface 106 may include a number of physical ports to which communication cables may be connected, a receiving and transmitting circuitry (not illustrated) to receive messages from and transmit messages to the physical ports, and a control circuitry (not illustrated) to control operations of the communication interface 106. In certain examples, the device(s) may interact with a file server (not illustrated), and the file server may then communicate with the storage system 100 via the communication interface 106 based on the device's instructions (e.g., the storage system 100 may be part of a network attached storage (NAS) system). In other examples, the device(s) may communicate with the storage system 100 via the communications interface 106 without relying on an intervening file server (e.g., the storage system 100 may be part of a storage area network (SAN)).

The storage media 102 may include non-volatile storage media such as solid-state storage media (e.g., flash media), magnetic storage media (such as that found in hard disk drives, tape drives, etc.), NVRAM, etc. for writing data. In particular, the storage media 102 may include storage locations (i.e., physical storage locations e.g., bit storage cells) at which data may be written. The storage media 102 may include a single physical storage medium or multiple physical storage media. In the examples described herein, the storage media 102 may include multiple physical storage media, but this is merely for convenience of description and should not be interpreted to exclude the possibility of the storage media 102 including a single storage medium. In certain examples, each physical storage medium of the storage media 102 may be a same type of storage medium (e.g., all flash media). In other examples, each physical storage medium of the storage media 102 may be of different types. For example, the storage media 102 may include some flash media and some magnetic media.

The storage controller 104 may comprise any system, device or apparatus that maintains and controls the storage media 102. In an example, the storage controller 104 may be implemented as a program of instructions that may be read by and executed on a processing circuitry, which may include one or more processors and one or more dedicated hardwares, to perform various functionalities described herein. In this context, "processor" refers to any circuitry capable of executing machine-readable instructions, such as a central processing unit (CPU), a microprocessor, a microcontroller device, a digital signal processor (DSP), etc. In this context, "dedicated hardware" may include an application-specific integrated circuit (ASIC), complex programmable logic device (CPLD), field-programmable gate array (FPGA), application-specific instruction set processor (ASIP), etc.

In examples in which the processing circuitry includes the processor(s) that are to execute machine-readable instructions, the machine-readable instructions may be stored in a memory. The memory may be any non-transitory machine readable medium, which may include a volatile storage medium (e.g., one or more volatile memory devices, such as DRAM device(s), SRAM device(s), etc.) or a non-volatile storage medium (e.g., one or more non-volatile memory devices, such as PROM device(s), EPROM device(s), EEPROM device(s), NVRAM device(s), flash device(s), hard drive(s), optical disk(s), etc.). In an example, the memory may include a non-transitory machine readable medium.

The storage controller 104 may control reading and writing of data to the storage media 102 based on requests received via the communication interface 106. In particular, the storage controller 104 may control to write to and read from the physical storage location(s) in the storage media 102. For example, in response to receiving a request to write data, the storage controller 104 may determine a physical storage location in the storage media 102 in which the data should be written, and may enable the data to be written to the physical storage location. As another example, in response to receiving a request to read data, the storage controller 104 may determine which physical storage location in the storage media 102 has written that data, and cause the data in that physical storage location to be read.

In certain examples, a single instance of the storage controller 104 may be included in the storage system 100, while in other examples multiple instances of the storage controller 104 may be included in the storage system 100. In some examples, the single instance of the storage controller 104 may control a single drive. In these examples, the storage controller 104 may be a disk controller. In some other examples, each of the multiple instances of the storage controller 104 may control a distinct drive. In these examples, the storage controller 104 may be an array controller. In certain examples, the storage controller 104 and the storage media 102 may be packaged together as a single storage module or device. In certain examples, the storage controller 104 and the storage media 102 may be included in separate modules or devices. For example, the storage controller 104 may be included in a server while the storage media 102 is included in a separate storage array that is connected to the server. In certain examples, the storage controller 104 may directly control the storage media 102, while in other examples, the storage controller 104 may control the storage media 102 indirectly by issuing commands (or requests) to another controller that controls the storage media 102.

The storage controller 104 may use storage virtualization techniques to abstract the physical storage locations of data written in the storage media 102. For example, the storage controller 104 may form multiple levels of virtualization that may each include a number of virtual (aka logical) storage spaces, with each virtual storage space mapping to either another virtual storage space or to the storage media 102. In some examples, the storage controller 104 may form a virtual storage space visible to a user as a space in which the user may write data, but when a user requests to write data to a particular storage location in the virtual storage space, the storage controller 104 may redirect the request to a physical storage location in the storage media 102 at which the data will be written. Similarly, for example, when a user requests to read data from a particular storage location in a virtual storage space, the storage controller 104 may redirect the request to a physical storage location in the storage media 102 at which the data is written. Examples of the virtual storage spaces may include virtual (logical) volumes, private data stores (PDSs), a data deduplication store (DDS), virtual (logical) disks, snapshots etc.

In some examples, a virtual storage space of one level may map to another virtual storage space of another level rather than mapping directly to the storage media 102. From the perspective of one level of virtualization, a next lower level of virtualization may be treated as if it were a physical storage medium. In certain examples, a given virtual storage space of one level of virtualization may map to multiple distinct virtual storage spaces of a next level of virtualization (or to multiple distinct virtual storage spaces of one or more physical storage media).

The structure of data as written to a given level of virtualization is not necessarily identical to the structure of the data as written in a next level of virtualization or in the storage media 102. For example, certain virtualization layers may provide functionalities such as encoding data, interleaving data, striping data, implementing RAID levels, and so forth, which might alter the structure of the data. Each virtual storage space may maintain metadata, which may be used to, among other things, keep track of mappings between the storage locations of the given level of virtualization and the storage locations of the next level of virtualization (or the physical storage locations of the storage media 102).

Figure 2:
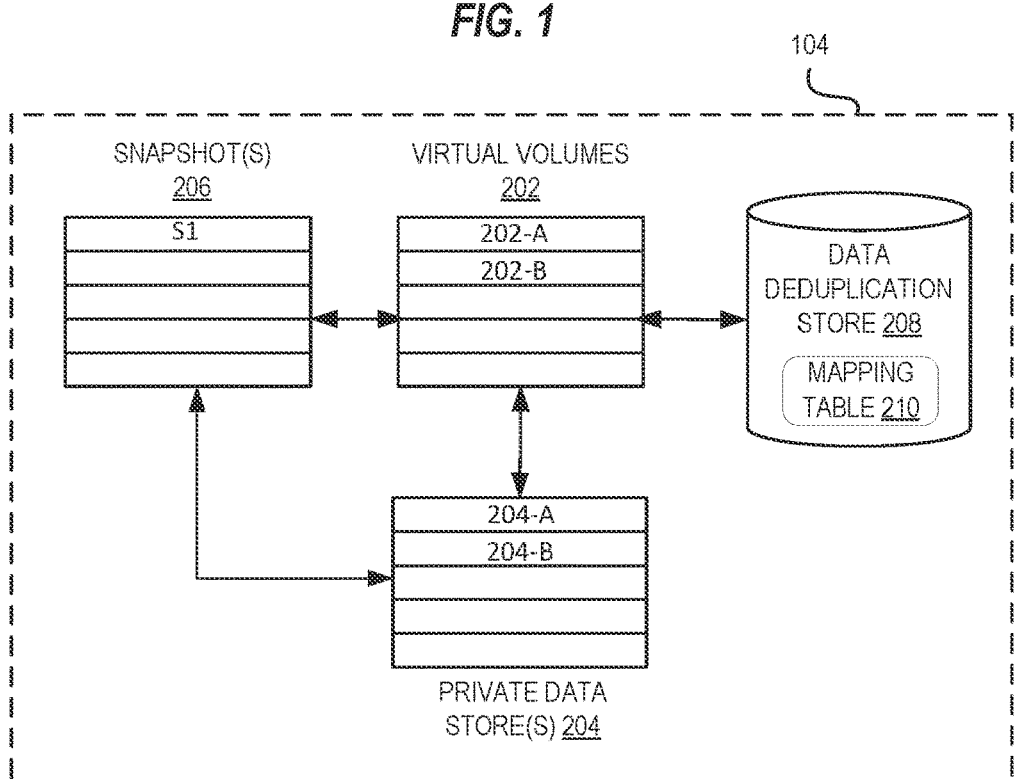
FIG. 2 illustrates an example storage controller that forms virtual volumes, private data stores, snapshots and a deduplication data store.

For example, as illustrated in FIG. 2, the storage controller 104 may form a plurality of virtual volumes 202, a plurality of PDSs 204, and a DDS 208. The virtual volumes 202 may be virtual storage spaces that are visible to users (e.g., client devices). The PDS(s) 204 may be virtual storage spaces that are in a lower level of virtualization than that of the virtual volumes 202. Each PDS 204 may be associated to one of the virtual volumes 202 and may write data from the associated virtual volume 202. In an example, the PDSs 204 may be intended to write singleton data from their respective virtual volumes 202.

The DDS 208 may be a virtual storage space that is shared among all of the virtual volumes 202. That is, the DDS 208 may write data from any of the virtual volumes 202. In an example, the DDS 208 may be intended to write duplicate data. In certain examples, the DDS 208 may be associated with another PDS (other than the PDSs 204, not shown) that is in a lower level of virtualization than that of the DDS 208. This other PDS may write data into itself from the DDS 208. In the examples described herein, when the DDS 208 writes a given data (e.g., duplicate data), it may mean that the PDS of the DDS 208 writes the given data.

Furthermore, one or more of the virtual volumes 202 may be associated with one or more snapshots 206. A snapshot may refer to a virtual copy of a virtual volume in a storage system at a point in time. In an example, more than one snapshots of a virtual volume may be created at different points in time. The snapshot(s) can be provided for various purposes, including data backup (e.g., to enable data recovery in case of faults, errors, or failures), data mining (e.g., to allow analysis of data to better understand the data), and/or for other purposes.

In an example, the snapshot(s) 206 may include a snapshot of one of the virtual volumes 202. In particular, the snapshot 206 copies one or more blocks of data, from a PDS 204 (e.g., one of the PDSs 204) associated with the virtual volume 202, that would be changed in the virtual volume 202 due to one or more write operations (note that unchanged data in the virtual volume 202 is not copied to the snapshot 206). In response to the write operations that modify the data block(s) in the virtual volume 202, the data block(s) that would be changed in the virtual volume 202 may be copied to the snapshot 206 prior to writing to the PDS 204. Accordingly, the snapshot 206 shares the PDS 204 associated with the virtual volume 202 and another PDS (e.g., other than the PDS 204 of the virtual volume 202, not shown) associated with the snapshot 206. The other PDS may write data from the snapshot 206.

In certain examples, the virtual volumes 202, the snapshot(s) 206 and the DDS 208 may map their respective storage locations directly to the physical storage locations in the storage media 102. However, in other examples a number of additional levels of virtualization (not illustrated) may be included between the virtual volumes 202, snapshot(s) 206, DDS 208 and the storage media 202.

As noted above, the virtual volumes 202, the PDSs 204, snapshot(s) 206 and the DDS 208 are all virtual entities i.e., virtual storage spaces. Thus, when it is said that data is "stored" in or "written" to one of these virtual storage spaces, this may not mean that the data is physically written in that virtual storage space. The data, ultimately, is physically written in the storage media 102. Instead, when it is said that data is written to a virtual storage space, this may mean that a pointer pointing to a physical storage location in a next lower level of virtualization that writes the data, is written in a metadata table, metadata index, or other data structure associated with the virtual storage space. For example, one of the PDSs 204 in FIG. 2 may write a given data by writing a pointer, in that PDS, pointing to a physical storage location in the storage media 102 at which the given data is written (or a reference pointer to a storage location in a next lower level of virtualization if there is one).

Furthermore, the storage controller 104 maintains the data deduplication in the storage system 100. In some examples, when the storage controller 104 receives a request as well as data to be written from the communication interface 106, the storage controller 104 may direct the request and data to one of the virtual volumes 202 to which the request is addressed. If the data is singleton data, the data is sent to one of the PDSs 204 that is associated with the virtual volume 202 and if the data is duplicate data, the data is sent to the DDS 208.

In accordance with the examples described herein, the storage controller 104 may perform several functionalities for maintaining the data deduplication in the storage system 100. In certain examples, the storage controller 104 may perform several functionalities for reducing or preventing writing singleton data in the DDS 208. In an example, the functionalities performed by the storage controller 104 may be performed by a processor executing instructions stored in a memory (e.g., a non-transitory machine readable medium). For example, the storage controller 104 may include a computing system including a processor executing the instructions which are described below in relation to FIG. 4. The functionalities performed by the storage controller 104 for maintaining data deduplication in the storage system 100 are described herein with the help of the flowcharts of FIGS. 3A-3C. In particular, FIGS. 3A-3C, individually, shows a flowchart for a set of method blocks of an example method for preventing singleton data to be written in the DDS 208 of the storage system 100. In some examples, the method at each method block in FIGS. 3A-3C, may be executed by a computing system 400 (FIG. 4) via a processor 402 that executes the instructions 406-412 stored in the non-transitory machine-readable storage medium 404, and the processor 402 executing instructions 406-412 may serve as or form part of the storage controller 104. Additionally, implementation of method blocks is not limited to such examples.

Although the below description is described with reference to the storage controller 104 of FIGS. 1 and 2, however other applications or devices suitable for the execution of the example methods of FIGS. 3A-3C may be utilized. Additionally, implementation of the methods is not limited to such examples. Although the example methods of FIGS. 3A-3C, individually, show a specific order of performance of certain functionalities, the methods are not limited to such order. For example, the functionalities shown in succession in the flowcharts may be performed in a different order, may be executed concurrently or with partial concurrence, or a combination thereof.

Figure 3A:
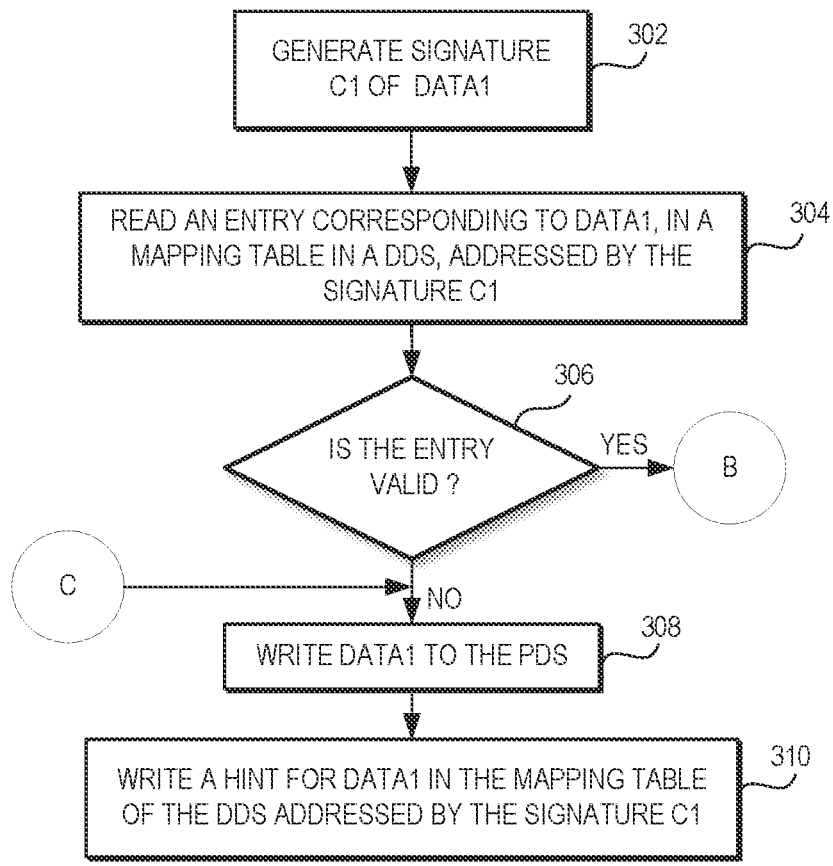
FIGS. 3A-3C. individually, illustrates a flowchart for a set of method blocks of an example method for maintaining data deduplication, in a storage system, including removing a state hint from a deduplication data store.

FIG. 3A is a flowchart of a first set of method blocks 302-310 of the example method, that is performed when data (e.g., DATA1) is received to be written in one of a plurality of virtual volumes of a storage system. In an example, blocks 302-310 may be performed by the storage controller 104. For the sake of illustration herein, it may be assumed that DATA1 has been sent to a virtual volume 202-A of the virtual volumes 202 to be written therein.

Referring to FIG. 3A, in block 302, on receiving DATA1, a signature C1 of DATA1 may be generated. As used herein, the term "signature" may be an identifier of data. The signature for the data can be in the form of a checksum that is produced by applying a checksum function on the content of the data. Examples of the checksum function may include a hash function, fingerprint, randomization function, and so forth. The signature of the data can be used to determine whether the data is different from any previously written data (i.e., the received data is "singleton data") or is similar to a previously written data (i.e., the received data is "duplicate data"). In the examples described herein, when DATA1 is received to be written in the storage system 100, the storage controller 104 may generate a checksum of DATA1. The checksum of DATA1 is the signature C1.

In response to receiving DATA1, it may be determined whether DATA1 should be written in the DDS 208 or in a PDS 204-A, of the PDSs 204, associated with the virtual volume 202-A that received DATA1. In an example, the storage controller 104 determines whether DATA1 is singleton data to be written in the PDS 204-A or is duplicate data to be written in the DDS 208.

In order to determine whether DATA1 is singleton data or duplicate data, the method may utilize entries in the DDS 208. In an example, the DDS 208 may include a mapping table 210 that includes entries corresponding to data received to the storage system 100. In particular, the mapping table 210 includes the entries corresponding to storage locations, in the DDS 208, addressed by signatures of the respective data that have been written in the storage system 100. Each entry may include a pointer pointing a storage location where the corresponding data is written. In some examples, an entry may include a pointer pointing to a storage location in a virtual volume or a snapshot of the virtual volume, in which the corresponding data is present, and thus may indicate that the corresponding data is present in a PDS of the virtual volume or the snapshot of the virtual volume. Such pointer may be referred to as a "hint" for the corresponding data, in the examples describe herein.

In block 304, an entry, in the DDS 208, corresponding to DATA1, may be read in the mapping table 210. In an example, reading the entry corresponding to DATA1 may mean reading the entry in the DDS 208 that corresponds to DATA1 by addressing the DDS 208 using the checksum (i.e., signature C1) of DATA1. That is, a storage location in the DDS 208 whose address corresponds to the signature C1 is read in the mapping table 210. In an example, the storage controller 104 reads the entry addressed by the signature C1.

In block 306, it may be then determined whether the entry corresponding to DATA1 is valid or invalid. Each entry in the mapping table 210 may be valid or invalid. In this context, a "valid" entry is an entry that is not empty and whose stored metadata has not been invalidated, while an invalid entry is an empty entry or an entry whose stored metadata has been invalidated. For example, an entry may be invalid when corresponding data is the first data (i.e., first write) being encountered (an entry may have its metadata invalidated when the corresponding data has been deleted from) to a storage system. Accordingly, an invalid entry may indicate that corresponding data is singleton data. In an example, any non-empty entry may be determined to be valid. An entry may be valid when corresponding data is not the first data (i.e., second write) being encountered. Accordingly, a valid entry may indicate that corresponding data may be same to a previously stored data having same signature as that of the corresponding data. That is, a valid entry may indicate that corresponding data is duplicate data. In certain examples, the entries may each include a flag that may be used to mark valid and invalid entries.

In some examples, when the entry is invalid ('NO' in block 306), this may mean that no other data of signature C1 has been encountered to the storage system 100. In other words, DATA1 may be written to the storage system 100 for the first time, and hence referred to as "first write" of DATA1. In such instances, it may be inferred that DATA1 is singleton data to the storage system 100, and therefore DATA1 can be written in the PDS 204-A. The method may proceed to blocks 308 and 310.

In block 308, DATA1 may be written to the PDS 204-A that is associated with the virtual volume 202-A that received DATA1 (i.e., to which DATA1 is written). In an example, the storage controller 104 writes DATA1 in the PDS 204-A.

In block 310, a hint for DATA1 may be written into the entry that is addressed by the signature C1 in the mapping table 210 of the DDS 208. In the examples described herein, writing the hint to the entry may include writing a pointer pointing to a storage location in the virtual volume 202-A that received DATA1. In an example, the storage controller 104 writes the hint for DATA1 into the entry addressed by the signature C1. In an example, this hint may be referred to as H1_P1.

In some examples, when the entry corresponding to DATA1 is valid ('YES' in block 306), the valid entry may indicate that a previously written data (e.g., DATA0 of signature C1) and DATA1 could be the same since their signatures are the same. That is, DATA1 may not be the first write to the storage system 100. DATA1 may be received to the storage system 100 a second time, and may be referred to as "second write." In these instances, it can be inferred that DATA1 may be duplicate data.

Further, in order to determine whether DATA1 (being the duplicate data) can be written in the DDS 208, additional information may be needed to determine whether DATA0 has been written in one of the PDSs 204 (being singleton data) or in the DDS 208 (being duplicate data). The method may then proceed to block 338, and may perform in a similar manner as described with respect to another data (i.e., DATA1') in blocks 338-348 of FIG. 3C (described in details later).

Figure 3B:
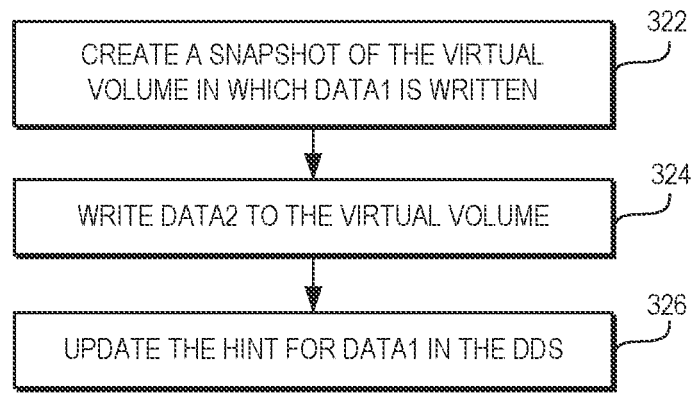

FIG. 3B is a flowchart of a second set of method blocks 322-326, of the example method performed in the storage system 100, following blocks 308 and 310 of FIG. 3A, when a request to write another data (i.e., DATA2) is received to be written at the same storage location in the virtual volume 202-A where DATA1 is already written.

In block 322, a snapshot S1 (as part of the snapshots 206) of the virtual volume 202-A may be created before writing DATA2 to the PDS 204-A that is associated with the virtual volume 202-A. In an example, the storage controller 104 creates the snapshot S1. In these examples, DATA 1 is present in the snapshot S1 (i.e., the snapshot S1 holds DATA 1 by pointing to the storage location in the virtual volume 202-A that received DATA1).

In block 324, DATA2 may be written at the same storage location in the PDS 204-A, of the virtual volume 202-A, where DATA1 was previously written. In some examples, upon receiving DATA2 to be written in the virtual volume 202-A, similar blocks may be performed to write DATA2 as described in FIG. 3A to write DATA1. In an example, the storage controller 104 writes DATA2 at the same storage location in the PDS 204-A where DATA1 was previously written. On writing DATA2 at the same storage location in the PDS 204-A where DATA1 was previously written, the snapshot S1 may hold DATA1 by pointing to the same storage location in the PDS (not shown in figures) of the snapshot S1.

In block 326, the hint (i.e., the hint H1_P1) for DATA1, that was written previously in block 310 (FIG. 3A), may be updated in the mapping table 210 of the DDS 208 to indicate that DATA1 is present in the snapshot S1. The hint H1_P1 may be updated to indicate that DATA1 is present in the snapshot S1 since DATA1 is not present in the virtual volume 202-A at this point in time (i.e., a first timestamp). In an example, the storage controller 104 updates the hint. While updating the hint for DATA1, in accordance with the examples described herein, an epoch value associated with the snapshot S1 is incorporated in the hint. In an example, the epoch value associated with the snapshot S1 at the first timestamp is a first epoch value.

An epoch value associated with a snapshot may refer to encoded information identifying a number of refresh operations performed on that snapshot. A refresh operation may refer to an operation performed on a snapshot, of a virtual volume in a storage system, to update the snapshot to hold the latest version of the virtual volume. In particular, the snapshot is updated to point to a storage location of the virtual volume that has written the latest data. In an example, an epoch value associated with the snapshot may be determined based on a timestamp. As such, a snapshot may be initialized with an epoch value of '0', which is incremented every time the refresh operation is performed on the snapshot. For example, an epoch value of a snapshot is 'n' at a timestamp. At a later timestamp, a refresh operation of the snapshot is performed. After performing the refresh operation, the epoch value of the snapshot increases to "n+1."

In the examples described herein, updating the hint may include writing a pointer, to the entry addressed by the signature C1, pointing to a storage location (that is the same storage location in the virtual volume 202-A where DATA1 was received) in the PDS of the snapshot S1, and the first epoch value. In an example, updating the hint at the first timestamp may mean writing another hint, at the first timestamp, that points to the storage location in the snapshot S1 and includes the first epoch value. In some examples, the first epoch value at the first timestamp when the hint is updated (or the other hint is written) may be '0' as no refresh operation is performed on the snapshot S1 so far. In such examples, the updated hint may be referred to as H1_S1_E0.

In such scenarios, upon writing DATA2 in the virtual volume 202-A, DATA1 is only present in the snapshot S1 of the virtual volume 202-A.

In some examples, a refresh operation may be performed on the snapshot S1 after performing block 326 of FIG. 3B. Upon performing the refresh operation, the snapshot S1 may be updated to hold the latest version of the virtual volume 202-A that includes DATA 2 (block 324). According, the updated snapshot S1 may hold DATA2 by pointing to the storage location in the virtual volume 202-A that received DATA2 in block 324.

Furthermore, upon performing the refresh operation, the snapshot S1 may exhibit a second epoch value that has incremented by 1 from the first epoch value. In these examples, the second epoch value associated with the snapshot S1, at a timestamp after performing the refresh operation, is "1." The snapshot S1 would exhibit the second epoch value (i.e., 1) until another refresh operation is performed.

In such scenarios, DATA1 may not be present in the PDS 204-A as well as in the snapshot S1. However, the hint H1_S1_E0 (that was updated in block 326) for DATA1 may still present in the DDS 208. The hint H1_S1_E0 may indicate that DATA1 is present in the snapshot S1 of the virtual volume 202-A.

Figure 3C:
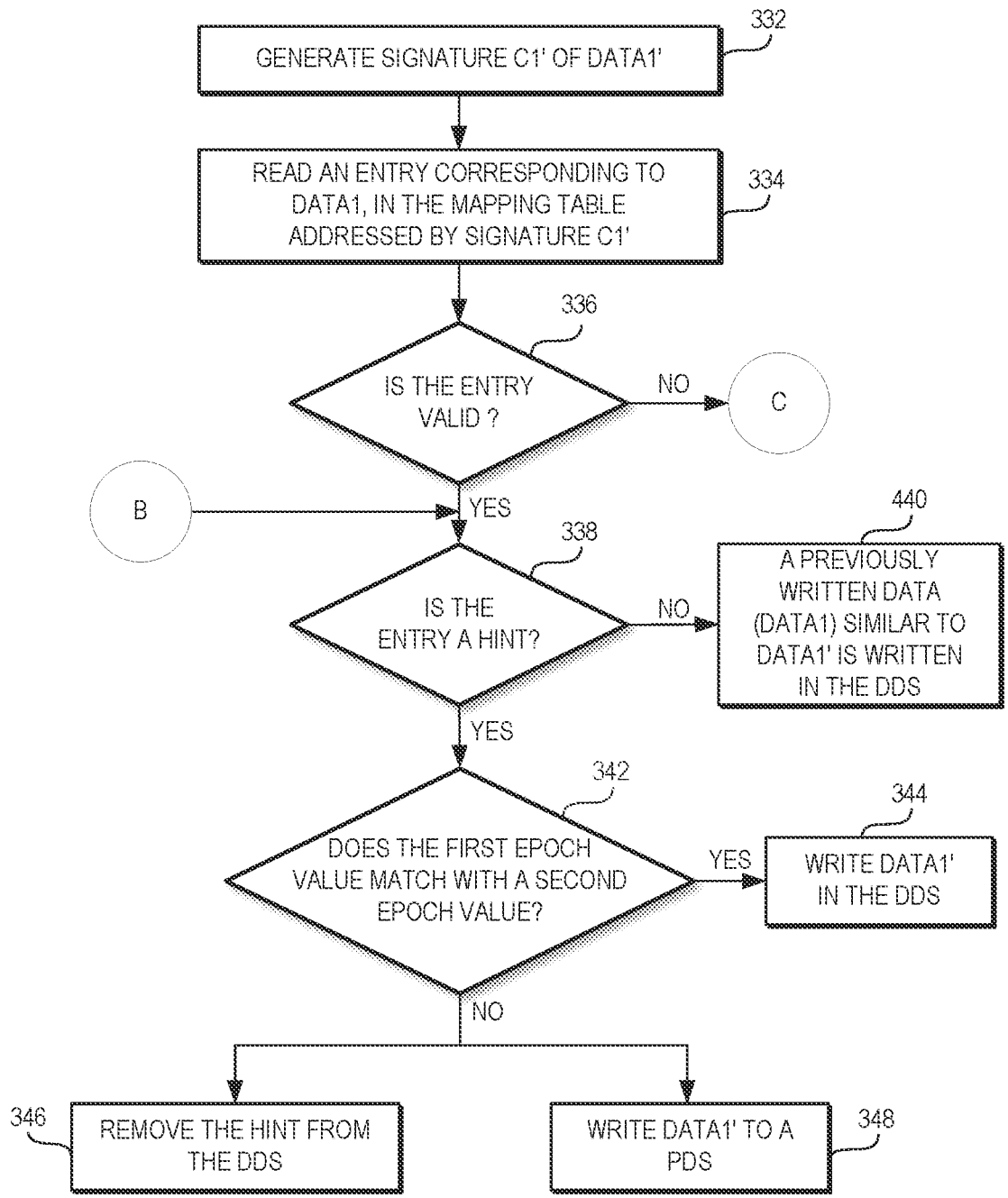

FIG. 3C is a flowchart of a third set of method blocks 332-348 of the example method performed in the storage system 100 when another data (DATA1') is received to be written to the storage system 100 after performing blocks 322-326 of FIG. 3B. Upon receiving DATA1' to be written in the storage system 100, blocks 332 and 334, similar to blocks 302 and 304 as described with respect to FIG. 3A, may be performed in FIG. 3C to write DATA1'. For the sake of illustration herein, it may be assumed that DATA1' has been sent to be written in a virtual volume 202-B of the virtual volumes 202.

In block 332, a signature C1' for DATA1' may be generated. In an example, the storage controller 104 obtains the checksum of DATA1' to generate the signature C1'.

In block 334, an entry corresponding to DATA1' (i.e., addressed by the signature C1') may be read in the mapping table 210 of the DDS 208. In an example, reading the entry corresponding to DATA1' may mean reading the entry in the DDS 208 that corresponds to DATA1' by addressing the DDS 208 using the checksum (i.e., signature C1') of DATA1'. In an example, the storage controller 104 reads the entry addressed by the signature C1' in the mapping table 210.

In block 336, it may be determined whether the entry corresponding to DATA1' is valid or invalid. In an example, the storage controller 104 determines whether the entry corresponding to DATA1' is valid or invalid. In some examples, when the entry is invalid ("NO" in block 336), this invalid entry may indicate that DATA1' is a first write received to the storage system 100. In such instances, the method may follow blocks 308 and 310 of FIG. 3A as described above, for writing DATA1' in a PDS 204-B, of the PDSs 204, associated to the virtual volume 202-B, to which DATA1' is received.

In other examples, the entry corresponding to DATA1' in the mapping table 210 is valid ("YES" in block 336). The valid entry may indicate that DATA1' may be the same as a previously written data (e.g., DATA1) in the storage system 100. In such examples, the signature C1' of DATA1' is the same as the signature C1 of DATA1. That is, DATA1' may be duplicate data of DATA1.

In block 338, it may be determined whether the entry addressed by the signature C1 is a hint. In an example, the storage controller 104 determines whether the entry is the hint. In some examples, the entry may be the hint ("YES" in block 338), which may indicate that DATA1 is present in one of the PDSs 204 that is associated to one of the virtual volumes 202 or one of the snapshot(s) 206 of the virtual volume (that received DATA1). In the examples described herein, the hint for DATA1, in block 338, is the hint H1_S1_E0, indicating that DATA1 is present in the snapshot S1, which was updated in block 326 of FIG. 3B.

The presence of the hint H1_S1_E0 at the entry may indicate that DATA1' may be duplicate data of DATA1, which is present in the snapshot S1 of the virtual volume 202-A. In such scenarios, the process may proceed to block 342.

In some other examples, when the entry is not the hint ("NO" in block 338), the entry may be a pointer indicating that the previously written data DATA1 is already written in the DDS 208 (i.e., duplicate data is already written in the DDS 208). In such instances, it may not be needed to write DATA1' in the storage system 100. In some examples, additional steps (e.g., comparing the contents of DATA1' and DATA1) may be performed to ensure that DATA1' and DATA1 are the same.

In block 342, it may be determined whether the first epoch value included in the hint for DATA1 matches with the second epoch value, associated with the snapshot S1, at a second timestamp. The second timestamp may be when DATA1' is received to be written. In an example, the storage controller 104 determines whether the first epoch value included in the hint for DATA1 matches with the second epoch value.

In some examples when the first epoch value included in the hint may not match ('NO' in block 342) with the second epoch value, this may indicate that the hint may be a stale hint. It may be, thus, identified that the hint may be the stale hint. In the examples described herein, the first epoch value included in the hint H1_S1_E0 is '0' and the second epoch value associated with the snapshot S1 at the second timestamp is '1' (since one refresh operation on the snapshot S1 have been performed as described above). Thus, in these examples, the first epoch value and the second epoch value do not match ("NO" in block 342). This indicates that the hint H1_S1_E0 for DATA1 at the entry addressed by the signature C1 is a stale hint. The method may now proceed to blocks 346 and 348.

In block 346, the hint H1_S1_E0 (being the stale hint) is removed from the DDS 208.

Furthermore, since the first epoch value may not match with the second epoch value, it may be determined that the snapshot S1 has been updated (i.e., updated by performing the refresh operation), and hence DATA1 may not be present in the updated snapshot S1. This may further indicate that DATA1' may be singleton data.

In block 348, DATA1' (being singleton data) may be written in the PDS 204-B associated to the virtual volume 202-B. On writing DATA1', a hint for DATA1' may be written, in the mapping table 210 of the DDS 208, at an entry addressed by the signature C1'.

In other examples, when the first epoch value and the second epoch value match ("YES" in block 342), this may indicate that the hint H1_S1_E0, at the entry, for DATA1 is not a stale hint. This may indicate that the snapshot S1 may not be updated and DATA1 may be present in the snapshot S1 of the virtual volume 202-A. In these example, DATA1' may be duplicate data. The method may now proceed to block 344.

In block 344, DATA1' (being duplicate data) may be written to the DDS 208.

Typically when an epoch value is not included in the hint, in the scenarios as described above, the hint at the entry in block 338, indicates that DATA1 is present in the snapshot S1. On determining that DATA1 is present in the snapshot S1, the storage controller 104 identifies DATA1' as duplicate data and writes DATA1' in the DDS 208. However, DATA1 is not actually present in the snapshot S1 since the snapshot S1 was updated (to the latest version of the virtual volume 202-A) by performing the refresh operation as discussed above after performing block 326 of FIG. 3B and prior to performing blocks 322-326 of FIG. 3C. In these scenarios, DATA1' being singleton data is mistakenly identified as duplicate data and is thereby written in the DDS 208. In this way, refresh operations can cause to write several singleton data in the DDS 208 of the storage system 100.

The techniques, described in the examples herein, provide simple methods for cleaning up stale hints from the DDS in contrast to an expensive scan method for identifying stale hints in the DDS. In the examples as described herein, stale hints can be identified by using epoch values in the hints. For example, as described above, when data (DATA1') is received to be written in the storage system 100, and a hint (i.e., H1_S1_E0), at the entry addressed by the signature C1' (or signature C1), is identified in the DDS 208 of the storage system 100, the first epoch value included in the hint is compared with the second epoch value associated with the snapshot S1. If the first and second epoch values match, the hint is not identified as a stale hint, which means that DATA1' is duplicate data and thus it may be written in the DDS 208. If the first and second epoch values don't match, the hint is identified as a stale hint. In such instances, the identified stale hint is removed from the DDS 208.

Thus, the described method helps in reducing or preventing singleton data to be written in a DDS of a storage system that otherwise be written in the DDS due to performing the refresh operations. Avoiding writing such singleton data in the DDS may help in reducing redundant data in the DDS, which, in turn, may reduce fragmentation of the DDS, and improve space usage and performance.

Figure 4:
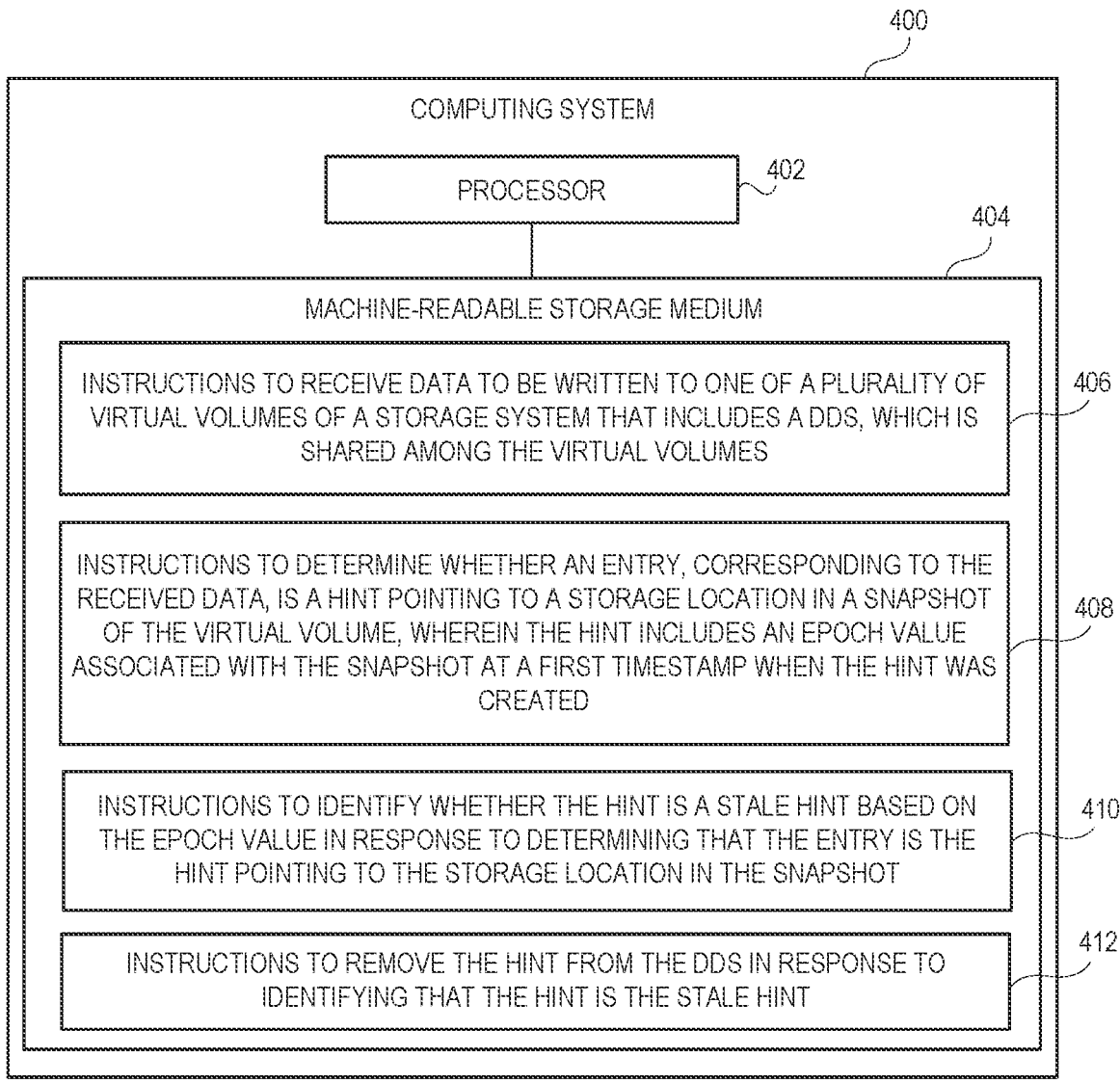
FIG. 4 is a block diagram of an example computing system including a processor and a machine-readable storage medium encoded with example instructions to maintain data deduplication in a storage system.

FIG. 4 is a block diagram of a computing system 400 including a processor 402 and a machine-readable storage medium 404 encoded with example instructions 406, 408, 410 and 412 (i.e., 406-412) to maintain data deduplication in a storage system (e.g., the storage system 100 of FIG. 1), in accordance with an example. In some examples, the machine-readable storage medium 404 may be accessed by the processor 402. The processor 402 may execute instructions (i.e., programming or software code) stored on the machine-readable storage medium 404. The instructions 406-412 of FIG. 4, when executed by the processor 402, may implement various aspects of maintaining data deduplication in a storage system. In some examples, the computing system 400 may be included in (e.g., as part of) a storage controller (e.g., the storage controller 104 of FIG. 1). For ease of illustration, FIG. 4 will be described with reference to FIG. 1. In certain examples, the instructions 406-412 may be executed for performing the functionalities of the storage controller 104 and one or more methods, such as, the methods described in FIGS. 3A-3C. In certain examples, as an alternative or in addition to executing the instructions 406-412, the processor 402 may include at least one IC, other control logic, other electronic circuitry, or combinations thereof that include a number of electronic components for performing the functionalities described herein as being performed by the storage controller 104.

Instructions 406, when executed by the processor 402, may receive data (e.g., DATA1') to be written to the virtual volume 202-B of the plurality of virtual volumes 202 of the storage system 100.

Instructions 408, when executed by the processor 402, may determine whether an entry corresponding to DATA1' (i.e., addressed by the signature C1' of DATA1') is a hint (i.e., the hint for DATA1) pointing to a storage location in a snapshot S1 of the virtual volume 202-A of the virtual volumes 202. In an example, the instructions 508 may include instructions, when executed by the processor 402, may determine whether the signature C1' of DATA1' may be the same as the signature C1 of DATA1. In response to determining that the signature C1' of DATA1' may be the same as the signature C1 of DATA1, the instructions 408 may include instructions, when executed by the processor 402, may determine the entry, in the mapping table 210, addressed by the signature C1. The instructions 408 may further include instructions, when executed by the processor 402, may determine whether the entry is the hint. In response to determining that the entry is the hint, it may be determined that the hint may be pointing to the storage location (that holds DATA1) in the snapshot S1. This may indicate that DATA1 (that may be similar to DATA1') may be present in the snapshot S1. In the examples described herein, the hint (i.e., H1_S1_E0) may include the first epoch value associated with the snapshot S1 at the first timestamp when the hint was written.

In response to determining that the entry may be the hint pointing to the storage location in the snapshot S1, instructions 410, when executed by the processor 402, may identify whether the hint is a stale hint based on the first epoch value. In an example, instructions 410, when executed by the processor 402, may determine whether the first epoch value included in the hint matches with the second epoch value of the snapshot S1 at the second timestamp when the data (i.e., DATA1') is received to be written in the storage system 100. In examples when the first epoch value does not match with the second epoch value, it may indicate that the hint may be the stale hint.

Instructions 412, when executed by the processor 402, may remove the hint from the DDS 208 in response to identifying that the hint may be the stale hint.

In examples when the first epoch value included in the hint matches with the second epoch value, it may indicate that the hint may not be the stale hint. In these examples, DATA1' may be written in the DDS 208.

Although not shown in FIG. 4, the machine-readable storage medium 404 may also include additional program instructions to perform various other method blocks described with respect to FIGS. 3A-3C.

As used herein, a "computing system" may be a server, storage device, storage array, desktop or laptop computer, switch, router, or any other processing device or equipment including a processor. In examples described herein, a processor may include, for example, one processor or multiple processors included in a single computing system or distributed across multiple computing systems. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processor may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing system executing the machine-readable instructions, or remote from but accessible to the computing system (e.g., via a computer network) for execution. In the examples illustrated in FIGS. 1 and 2, the storage controller 104 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). All of the features disclosed in this specification (including any accompanying claims, abstract and drawings), and/or all of the elements of any method or process so disclosed, may be combined in any combination, except combinations where at least some of such features and/or elements are mutually exclusive.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

The invention claimed is:

1. A method for maintaining deduplication in a storage system, comprising:
   receiving, by a storage controller, data to be written to one of a plurality of virtual volumes of a storage system, the storage system including a deduplication data store (DDS) that is shared among the virtual volumes;
   determining, by the storage controller, whether an entry in the DDS, corresponding to the received data, is a hint pointing to a storage location in a snapshot of the virtual volume, wherein the hint comprises an epoch value associated with the snapshot at a first timestamp when the hint was written;
   in response to determining that the entry in the DDS is the hint pointing to the storage location in the snapshot, identifying, by the storage controller, whether the hint is a stale hint based on the epoch value; and
   in response to identifying that the hint is the stale hint, removing, by the storage controller, the hint from the DDS.

2. The method of claim 1, further comprising reading the entry in the DDS that corresponds to the received data for use in the determining by addressing the DDS using a checksum of the received data.

3. The method of claim 1, wherein the epoch value associated with the snapshot changes every time a refresh operation is performed on the snapshot.

4. The method of claim 1, wherein
   the epoch value associated with the snapshot at the first timestamp is a first epoch value, and
   the method further comprises determining, by the storage controller, whether the first epoch value included in the hint matches with a second epoch value associated with the snapshot at a second timestamp for identifying whether the hint is the stale hint, wherein the second timestamp is when the data is received.

5. The method of claim 4, wherein:
   in response to determining that the first epoch value does not match with the second epoch value, identifying that the hint is the stale hint.

6. The method of claim 4, wherein:
   in response to determining that the first epoch value matches with the second epoch value, identifying that the hint is not the stale hint.

7. The method of claim 1, further comprising:
in response to identifying that the hint is the stale hint, writing the received data in a private data store associated to the virtual volume.

8. The method of claim 1, further comprising:
in response to identifying that the hint is not the stale hint, writing the received data in the DDS.

9. An article comprising at least one non-transitory machine-readable storage medium storing instructions executable by at least one processor of a storage system to:
receive data to be written to one of a plurality of virtual volumes of a storage system, the storage system including a deduplication data store (DDS) that is shared among the virtual volumes;
determine whether an entry in the DDS, corresponding to the received data, is a hint pointing to a storage location in a snapshot of the virtual volume, wherein the hint comprises an epoch value associated with the snapshot at a first timestamp when the hint was written;
in response to determining that the entry in the DDS is the hint pointing to the storage location in the snapshot, identify whether the hint is a stale hint based on the epoch value; and
in response to identifying that the hint is the stale hint, remove the hint from the DDS.

10. The article of claim 9, wherein the instructions further comprise instructions, executable by the at least one processor, to read the entry in the DDS that corresponds to the received data for use in the determining by addressing the DDS using a checksum of the received data.

11. The article of claim 9, wherein the epoch value associated with the snapshot changes every time a refresh operation is performed on the snapshot.

12. The article of claim 9, wherein
the epoch value associated with the snapshot at the first timestamp is a first epoch value, and
the instructions to identify whether the hint is the stale hint comprises instructions, executable by the at least one processor, to determine whether the first epoch value included in the hint matches with a second epoch value associated with the snapshot to identify whether the hint is the stale hint, wherein the second timestamp is when the data is received.

13. The article of claim 12, wherein:
in response to determining that the first epoch value does not match with the second epoch value, the instructions to identify comprise instructions, executable by the at least one processor, to identify that the hint is the stale hint.

14. The article of claim 12, wherein:
in response to determining that the first epoch value matches with the second epoch value, the instructions to identify comprise instructions, executable by the at least one processor, to identify that the hint is not the stale hint.

15. The article of claim 9, wherein the instructions further comprise instructions, executable by the at least one processor, to write the received data in a private data store associated to the virtual volume in response to identifying that the hint is the stale hint.

16. The article of claim 9, wherein the instructions further comprise instructions, executable by the at least one processor, to write the received data in the DDS in response to identifying that the hint is not the stale hint.

17. A storage system comprising:
at least one processor;
at least one non-transitory machine-readable storage medium comprising instructions executable by the at least one processor to:
receive data to be written to one of a plurality of virtual volumes of a storage system, the storage system including a deduplication data store (DDS) that is shared among the virtual volumes;
determine whether an entry in the DDS, corresponding to the received data, is a hint pointing to a storage location in a snapshot of the virtual volume, wherein the hint comprises an epoch value associated with the snapshot at a first timestamp when the hint was written;
in response to determining that the entry in the DDS is the hint pointing to the storage location in the snapshot, identify whether the hint is a stale hint based on the epoch value; and
in response to identifying that the hint is the stale hint, remove the hint from the DDS.

18. The storage system of claim 17, wherein
the epoch value associated with the snapshot at the first timestamp is a first epoch value, and
the instructions to identify whether the hint is the stale hint comprises instructions, executable by the at least one processor, to determine whether the first epoch value included in the hint matches with a second epoch value associated with the snapshot to identify whether the hint is the stale hint, wherein the second timestamp is when the data is received.

* * * * *